US00RE41353E

(19) United States
(12) Reissued Patent
McGrath et al.

(10) Patent Number: US RE41,353 E
(45) Date of Reissued Patent: May 25, 2010

(54) CABLE MANAGER FOR NETWORK RACK

(75) Inventors: Michael J. McGrath, New Lenox, IL (US); Kevin L. Goodwin, Frankfort, IL (US); Charles F. VanderVelde, Frankfort, IL (US); Donald C. Wiencek, Tinley Park, IL (US)

(73) Assignee: Panduit Corp., Tinley Park, IL (US)

(21) Appl. No.: 10/992,640

(22) Filed: Nov. 18, 2004

Related U.S. Patent Documents

Reissue of:
(64) Patent No.: 6,766,093
Issued: Jul. 20, 2004
Appl. No.: 09/814,621
Filed: Mar. 22, 2000

U.S. Applications:
(63) Continuation-in-part of application No. 09/261,881, filed on Mar. 3, 1999, now Pat. No. 6,437,243.
(60) Provisional application No. 60/192,989, filed on Mar. 28, 2000.

(51) Int. Cl.
*G02B 06/46* (2006.01)
*H02G 11/00* (2006.01)

(52) U.S. Cl. ..... 385/134; 379/327
(58) Field of Classification Search ..... 385/134–135
See application file for complete search history.

(56) References Cited

U.S. PATENT DOCUMENTS

| | | | |
|---|---|---|---|
| 2,531,110 | A | 11/1950 | Cisler |
| 2,921,607 | A | 1/1960 | Caveney |
| 3,024,301 | A | 3/1962 | Walch |
| 3,126,444 | A | 3/1964 | Taylor |
| 3,229,029 | A | 1/1966 | Weiss |
| 3,321,571 | A | 5/1967 | Lynch |
| 3,485,937 | A | 12/1969 | Caveney |
| 3,705,949 | A | 12/1972 | Weiss |
| 3,711,633 | A | 1/1973 | Ghirardi et al. |
| 3,761,603 | A | 9/1973 | Hays et al. |

(Continued)

FOREIGN PATENT DOCUMENTS

| | | | |
|---|---|---|---|
| DE | 7914008 | U1 | 8/1979 |
| DE | 3335884 | A1 | 10/1983 |
| DE | 8412625 | U1 | 7/1984 |

(Continued)

OTHER PUBLICATIONS

"Enteraprise Structured Connectivity Systems: Glide Cable Management System", ADC Telecommunications, Inc. 1999.*

(Continued)

*Primary Examiner*—Chih-Cheng G Kao
(74) *Attorney, Agent, or Firm*—Robert A. McCann; Christopher S. Clancy

(57) ABSTRACT

A cable manager provides horizontal cable management of adjacent patch panels or network equipment on network distribution racks. The cable manager includes a central section and a front cable routing section and is mountable on a network rack, such as an EIA rack. The central section has a longitudinal width sized to fit within the network rack, a front side, a rear side, and rack mounting holes provided on opposite longitudinal ends of the central section. The front cable routing section extends from the front side of the central section and includes a plurality of spaced fingers having an arcuate surface that provides bend radius control. A slit provides flexibility to the fingers. Ears extend laterally from the fingers. The cable manager can also include a rear cable routing section that includes a second plurality of spaced fingers. One or more passthrough openings can be provided in the central section to allow routing of cabling from the front section to the rear section. Either or both of the front and rear sections can include a removable cover. The cover may be hingedly connected.

12 Claims, 9 Drawing Sheets

U.S. PATENT DOCUMENTS

| | | | | |
|---|---|---|---|---|
| 3,786,171 | A | | 1/1974 | Shira |
| 3,890,459 | A | | 6/1975 | Caveney |
| 3,906,146 | A | | 9/1975 | Taylor |
| 3,968,322 | A | | 7/1976 | Taylor |
| 4,136,257 | A | | 1/1979 | Taylor |
| 4,160,880 | A | | 7/1979 | Brey |
| 4,177,359 | A | | 12/1979 | Naranjo |
| 4,398,564 | A | | 8/1983 | Young et al. |
| 4,423,284 | A | | 12/1983 | Kaplan |
| 4,477,131 | A | | 10/1984 | Joly |
| 4,484,020 | A | | 11/1984 | Lööf et al. |
| 4,630,886 | A | | 12/1986 | Lauriello et al. |
| 4,640,314 | A | | 2/1987 | Mock |
| 4,697,720 | A | | 10/1987 | Hotchkiss et al. |
| 4,759,057 | A | | 7/1988 | De Luca et al. |
| 4,857,670 | A | | 8/1989 | Frank |
| 4,898,550 | A | | 2/1990 | Ayer |
| 4,942,271 | A | | 7/1990 | Corsi et al. |
| 4,953,735 | A | | 9/1990 | Tisbo et al. |
| 5,023,404 | A | | 6/1991 | Hudson et al. |
| 5,024,251 | A | | 6/1991 | Chapman |
| 5,073,841 | A | | 12/1991 | DelGuidice et al. |
| 5,086,195 | A | | 2/1992 | Claisse |
| 5,134,250 | A | | 7/1992 | Caveney et al. |
| 5,235,136 | A | | 8/1993 | Santucci et al. |
| 5,240,209 | A | | 8/1993 | Kutsch |
| 5,442,725 | A | | 8/1995 | Peng |
| 5,448,015 | A | | 9/1995 | Jamet et al. |
| 5,640,482 | A | | 6/1997 | Barry et al. |
| 5,709,249 | A | | 1/1998 | Okada et al. |
| 5,715,348 | A | | 2/1998 | Falkenberg et al. |
| 5,728,976 | A | | 3/1998 | Santucci et al. |
| 5,788,087 | A | | 8/1998 | Orlando |
| 5,902,961 | A | | 5/1999 | Viklund et al. |
| 5,926,916 | A | | 7/1999 | Lee et al. |
| 5,942,729 | A | | 8/1999 | Carlson, Jr. et al. |
| 5,964,611 | A | | 10/1999 | Jacob et al. |
| 6,011,221 | A | | 1/2000 | Lecinski et al. |
| 6,107,575 | A | | 8/2000 | Miranda |
| 6,107,576 | A | | 8/2000 | Morton et al. |
| 6,215,069 | B1 | | 4/2001 | Martin et al. |
| 6,321,340 | B1 | | 11/2001 | Shin et al. |
| 6,380,484 | B1 | | 4/2002 | Theis et al. |
| 6,424,781 | B1 | | 7/2002 | Puetz et al. |
| 6,468,112 | B1 | | 10/2002 | Follingstad et al. |
| 6,489,565 | B1 | * | 12/2002 | Krietzman et al. ..... 174/101 |
| 6,539,161 | B2 | | 3/2003 | Holman et al. |
| 2001/0032729 | A1 | * | 10/2001 | Arthur ..... 174/65 G |

FOREIGN PATENT DOCUMENTS

| | | | |
|---|---|---|---|
| DE | 4003279 | A1 | 8/1991 |
| EP | 0 637 178 | A1 | 2/1995 |
| EP | 0 795 935 | A2 | 9/1997 |
| FR | 2425518 | A | 1/1980 |
| JP | S57-163126 | | 10/1982 |
| JP | H01-134050 | | 9/1989 |
| JP | H02-14217 | | 1/1990 |
| JP | H05-4718 | | 1/1993 |
| JP | H05-24554 | | 3/1993 |
| JP | H05-67055 | | 9/1993 |
| JP | H05-75108 | | 10/1993 |
| JP | H07-86765 | | 3/1995 |
| JP | H07-26257 | | 5/1995 |
| JP | 3026444 | | 7/1996 |

OTHER PUBLICATIONS

"Global DSX (E1) Planning and Engineering Guide: Introduction DSX System Design Planning Tutorial Planning Worksheets Specifications General Information" 1st Edition, Issue 1, Mar. 1997.*

Panduit, Catalog titled "Communication Products", front cover, back cover, and pp. 59, 60, 61, 71, and 72, dated 1996.*

*PANDUIT Communication Products Catalog*, front cover and pp. D33–D35, 1998.

ADC Telecommunicatons Enteraprise™ Glide Cable Management System, 8 pages, Aug. 1999.

"Hinged Cover Assembly for Glide Cable Management Installation Instructions," ADC Telecommunications, Inc. Issue:11–2 (Sep. 2000).

Telecom Equipment Supports, Saunders' Cable Runway & Relay Racks, B–Line Systems, Inc., front cover, p. 48 and back cover (1996).

*"PAN–NET* Cable Management Systems Hinged Covers," PANDUIT Product Bulletin, 2 pgs. (Sep. 1999).

"Hubbell Premise Wiring 2U Horizontal Cable Management Panel Assembly" Schematic, one page, date unknown.

Panduit Corp. 1999 Installation Instructions for "Attaching the Hinged Cover to the Horizontal/Vertical Cable Management," 1 pg. (1999).

"Advanced Horizontal Cable Management Framework for the Cross Connect," Hubbell Premise Wiring, 3 pgs., date unknown.

Ortronics, Inc.'s 1996 Full Line System Solutions Catalog, front cover, p. 61 and back cover (1996).

PANDUIT Communication Products Catalog, front cover and p. D36, 1998.

* cited by examiner

CABLE MANAGER FOR NETWORK RACK

Matter enclosed in heavy brackets [ ] appears in the original patent but forms no part of this reissue specification; matter printed in italics indicates the additions made by reissue.

[Applicant claims, under 35 U.S.C. §119(e), the benefit of priority of the filing date of Mar. 28, 2000, of U.S. Provisional Patent Application Ser. No. 60/192,989, filed on the aforementioned date, the entire contents of which are incorporated herein by reference.]

*Application Ser. No. 09/814,621, filed on Mar. 22, 2001, is a continuation-in-part of application Ser. No. 09/261,881, filed on Mar. 3, 1999, now U.S. Pat. No. 6,437,243.*

BACKGROUND OF THE INVENTION

1. Field of Invention

The present invention relates generally to cable management devices for patch panel or network equipment racks, and more particularly to a cable manager for use with adjacent patch panels or network equipment on distribution racks or within cabinets, with an improved finger and cover design.

2. Description of Related Art

Cabling, such as UTP, ScTP, coax and fiber optic cabling, is being increasingly used in the telecommunications industry to provide data, voice, video, or audio information. Patch panel or network equipment enclosure and rack systems are well-known in the industry and provided to manage and organize such cables to or from equipment or cross-connect systems. These systems usually include a standard EIA 19", 23" or other distribution frame rack on which one or more patch panels, network equipment, fiber optic enclosures and the like are mounted. Enclosures within the rack serve various functions, including operation as slack trays, splice trays, cable organizers and patch panels. These racks also serve as inter-connect or cross-connect enclosures when interfacing with equipment, or may serve as a telecommunications closet, allowing the cables to be terminated, spliced, patched or stored at places along their length.

The rack usually is formed of a frame having mounting apertures located along vertical legs or walls of the rack. Patching equipment, such as a patch panel, is mounted on the rack so as to define generally a patching side where patch cords coming from an active device or another patch panel can be cross-connected and interconnected, and a distribution side where cables from network equipment or a work station area are terminated. Generally some form of cable management is also provided on both sides of the rack to support and route the cables. While preventing detrimental bending is always important even for copper cabling, with the increasing use of fiber optic connectors as applied to connector rack systems, proper cable management and bend radius control has become increasingly important. Many known systems are unable to provide complete bend radius control, are inefficient in use, difficult to manufacture, or have other drawbacks and thus, improvement in the cable management of network rack systems is desired.

SUMMARY OF THE INVENTION

It is therefore an object of the present invention to provide an improved cable management device.

It is a further object of the present invention to provide a cable manager for a network rack with an improved finger design that provides more effective bend radius control.

It is another object of the present invention to provide a single cable manager device that provides improved cable management to each side of a network rack.

It is still further an object of the present invention to provide an improved readily installable molded cable manager with a hinged cover for a network rack system.

Various ones of the above and other features and objects of the invention are provided by a cable manager mountable to a network rack. The cable manager includes a central section and a front cable routing section. The central section has a longitudinal width sized to fit within the network rack, a front side, a rear side, and rack mounting holes provided on opposite longitudinal ends of the central section. The front cable routing section extends from the front side of the central section and includes a plurality of spaced fingers extending transversely from the front side of the central section. Each of the plurality of spaced fingers has an arcuate surface that provides bend radius control. A slit is medially disposed along the arcuate surface and extends from a distal end of the finger towards a proximal end of the finger. At least one ear laterally extends from the distal end in a receiving space between adjacent fingers.

Various ones of the above and other features and objects of the invention are also provided by a cable manager mountable to a network rack, comprising a central section, a front cable routing section and a rear cable routing section. The central section has a longitudinal width sized to fit within the network rack, a front side, a rear side, and rack mounting holes provided on opposite longitudinal ends of the central section. The front cable routing section extends from the front side of the central section and includes a first plurality of spaced fingers extending transversely from the front side of the central section and retaining flanges extending from distal ends of multiple ones of the first plurality of spaced fingers. The rear cable routing section extends from the rear side of the central section, the rear cable routing section including a second plurality of spaced fingers extending transversely from the rear side of the central section and retaining flanges extending from distal ends of multiple ones of the second plurality of spaced fingers.

Various ones of the above and other features and objects of the invention are also provided by a network rack containing the above cable manager.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

A cable manager 10 according to an exemplary embodiment of the present invention is generally shown in FIGS. 1–10 and is useful in providing horizontal cable management in a network rack.

Cable manager 10 is preferably formed by an injection molding process in which two halves, preferably identical halves, are molded and then snap fit together to form a single cable manager device that is mountable on and provides cable management to both a patching side and a distribution side of a network rack. A suitable rack is a conventional 19" or 23" EIA network rack that has spaced vertical rails or legs that allow mounting of various numbers of rack elements thereon. However, the invention is equally applicable to other known or subsequently developed racks. Moreover, a network rack need not be an open frame structure as in the above EIA racks, but may include mounting cabinets or enclosures having mounting features and walls defining openings that can receive and fix rack elements, such as cable manager 10, patch panels, and the like.

Figure 1:
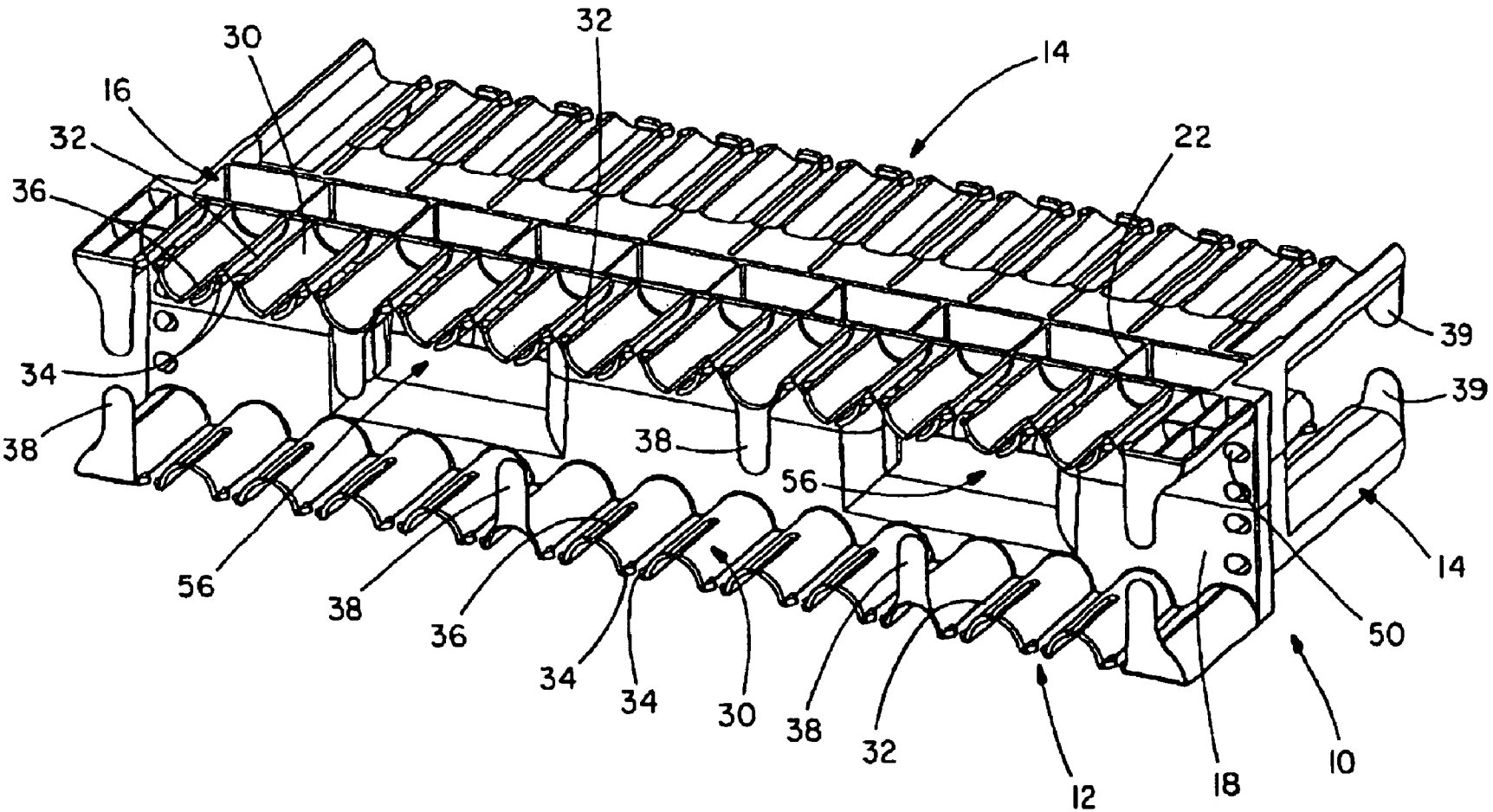
FIG. 1 shows a top front perspective view of a cable manager of the present invention.
Figure 2:
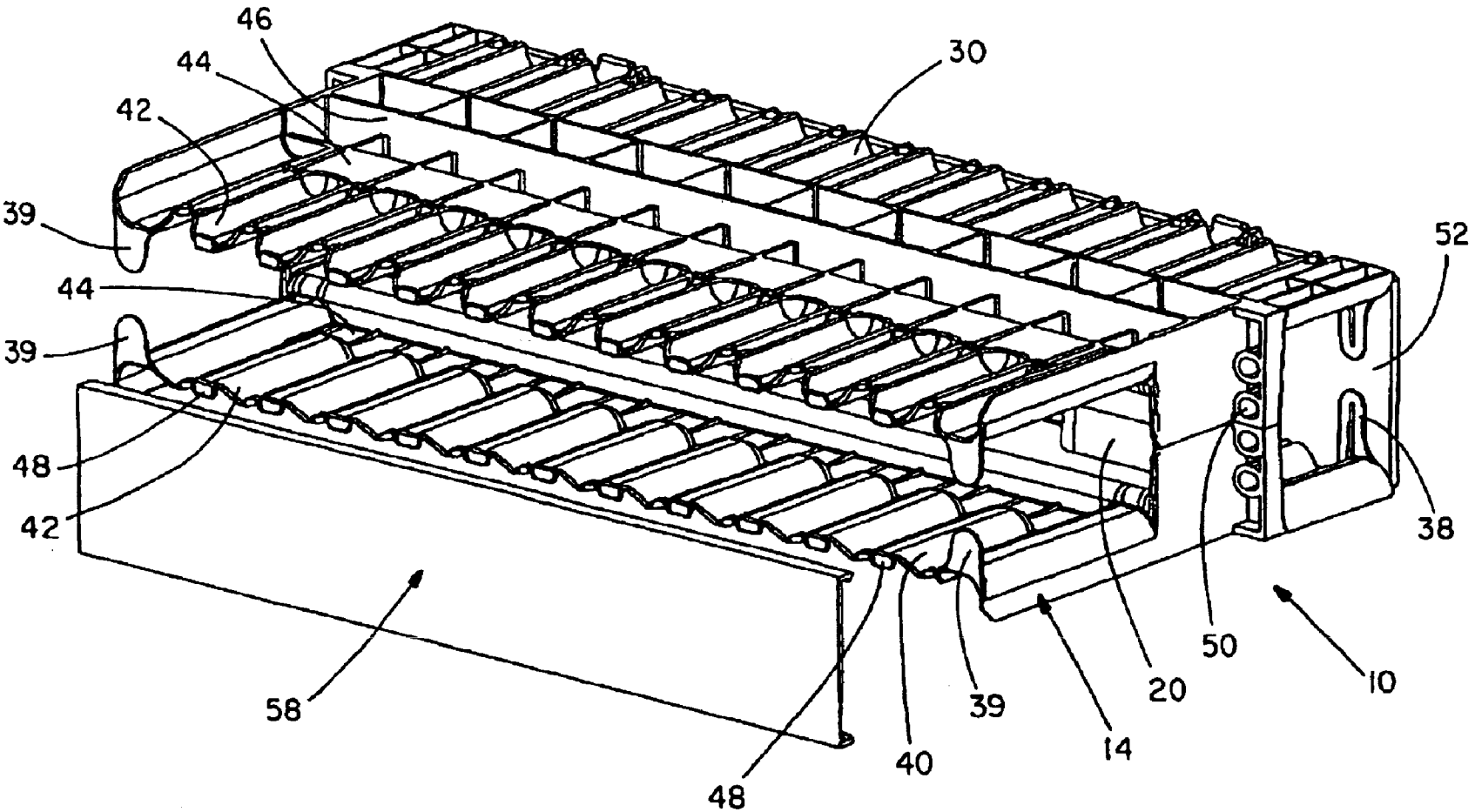
FIG. 2 is a top rear perspective view of the cable manager of FIG. 1, with the rear cover removed.

As can be seen from FIGS. 1 and 2, cable manager 10 generally includes a front cable routing section 12, a rear cable routing section 14 and a central section 16, which preferably has passthrough capabilities. The front and rear cable routing sections 12, 14 generally include a pair of back-to-back channels each formed by a base section 18, 20 and a plurality of upstanding fingers 30, 40 disposed longitudinally along at least one and preferably two opposing sides (front and rear) of the respective base sections.

Central section 16 has a suitable height, a longitudinal width sized to fit within a desired network rack, and a depth which approximates the depth dimension of rack legs 60 (FIGS. 3 and 7) or a mounting cabinet (not shown) to which the cable manager 10 is mounted. In the case of a 19" network rack, the width would be approximately 19" when mounted horizontally on the rack and the height would be a multiple of 1.75", which is a standard single device height. However, these are exemplary and may change depending on the size and type of rack used. Each longitudinal end of the central section 16 contains a plurality of mounting holes 50 that mount the cable manager to a frame structure, such as legs 60 of a standard rack system or to walls of a mounting cabinet (unshown). The legs 60 (or other equivalent mounting frame structure) have various apertures that allow mounting of the cable manager to the rack by a suitable mounting element, such as a bolt, that extends through the mounting holes and rack apertures aligned therewith. The base sections 18, 20 are integrally connected by a central wall and a plurality of strengthening walls 22 to comprise the central section 16.

The central section 16 of the cable manager is preferably a passthrough section that includes one or more passthrough openings 56. The passthrough openings 56 allow installers the ability to route cables from one side of the rack to the other (i.e., from the patching side to the distribution side and the converse). The passthrough openings 56 preferably are formed with curved sidewalls that provide bend radius control to the cables routed through the passthrough openings.

The front cable routing side of the cable manager (front section 12) preferably forms the patching side where active equipment is interconnected or patch cords on a patch panel are cross-connected. As shown in FIGS. 1, 4, 5 and 7, patching side fingers 30 extend from base section 18 in the form of two parallel and spaced rows that define a cable channel. Fingers are separated from adjacent fingers 30 to provide a space 32 for routing cables from within the cable channel to the equipment either above or below on the rack. The fingers 30 preferably extend outwardly beyond the frame legs 60 as shown. Each of the plurality of patching side fingers 30 are formed having an inwardly directed arcuate surface at least on a distal portion of the finger. The arcuate surfaces of fingers 30 have a predefined minimum radius that provides a bend radius control surface for wires and cables. The minimum bend radius can vary depending on the types of wires and cables used. An exemplary radius may be 1" or greater for many applications. However, the minimum bend radius should be selected to correspond to desired criteria of cable(s) to be managed by the cable manager.

Fingers 30 are also provided with a pair of ears 34 formed near the distal end with each ear extending towards an opposing ear formed on an adjacent finger 30. The ears 34 preferably have a generally triangular configuration that provides angled surfaces which assist in the insertion and removal of cables from in between the fingers. As the formation of the fingers with an arcuate cross-section has been found to result in a relatively stiff structure, each finger 30 on the patching side also includes a slit 36 medially disposed along the arcuate surface of the finger. Slit 36 is formed to extend from the distal end towards the base approximately one-half the length of finger 30. Slit 36 provides additional flexibility to fingers 30 during routing of cables.

Figure 3:
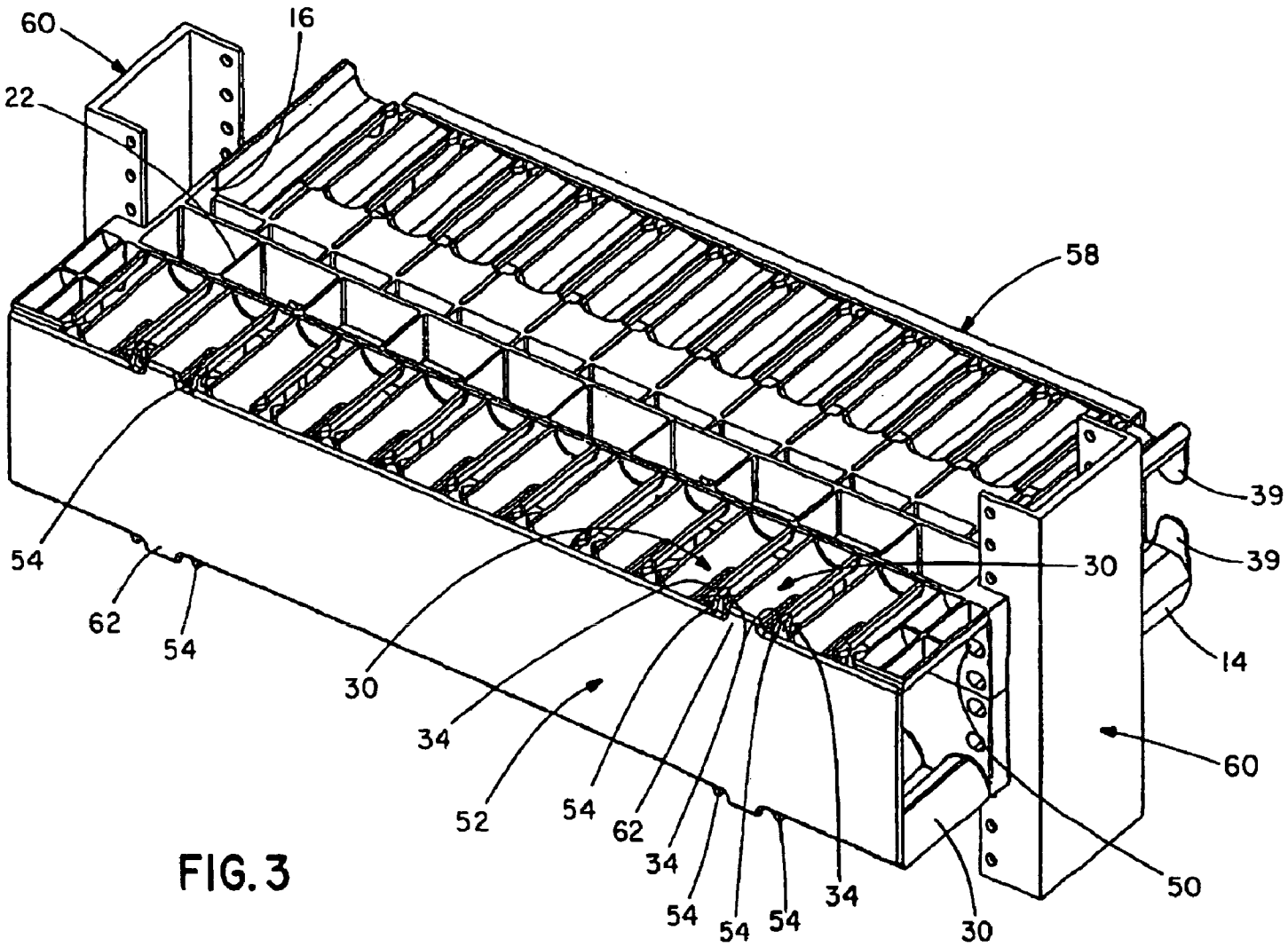
FIG. 3 is a top front perspective view of the cable manager of FIG. 1, shown with closed covers.
Figure 4:
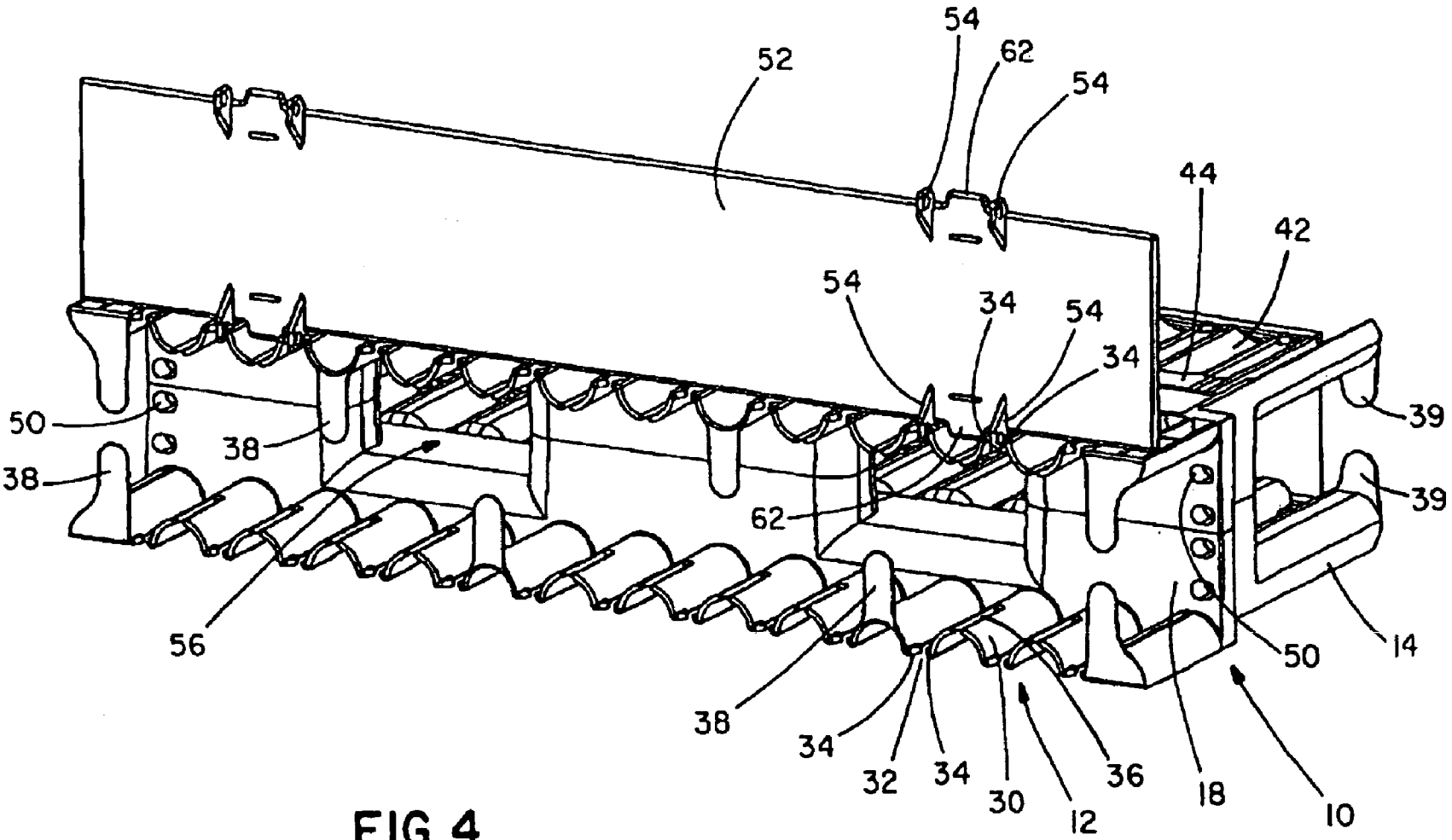
FIG. 4 is a top front perspective view of the cable manager of FIG. 1 with a front cover in a top open position.
Figure 5:
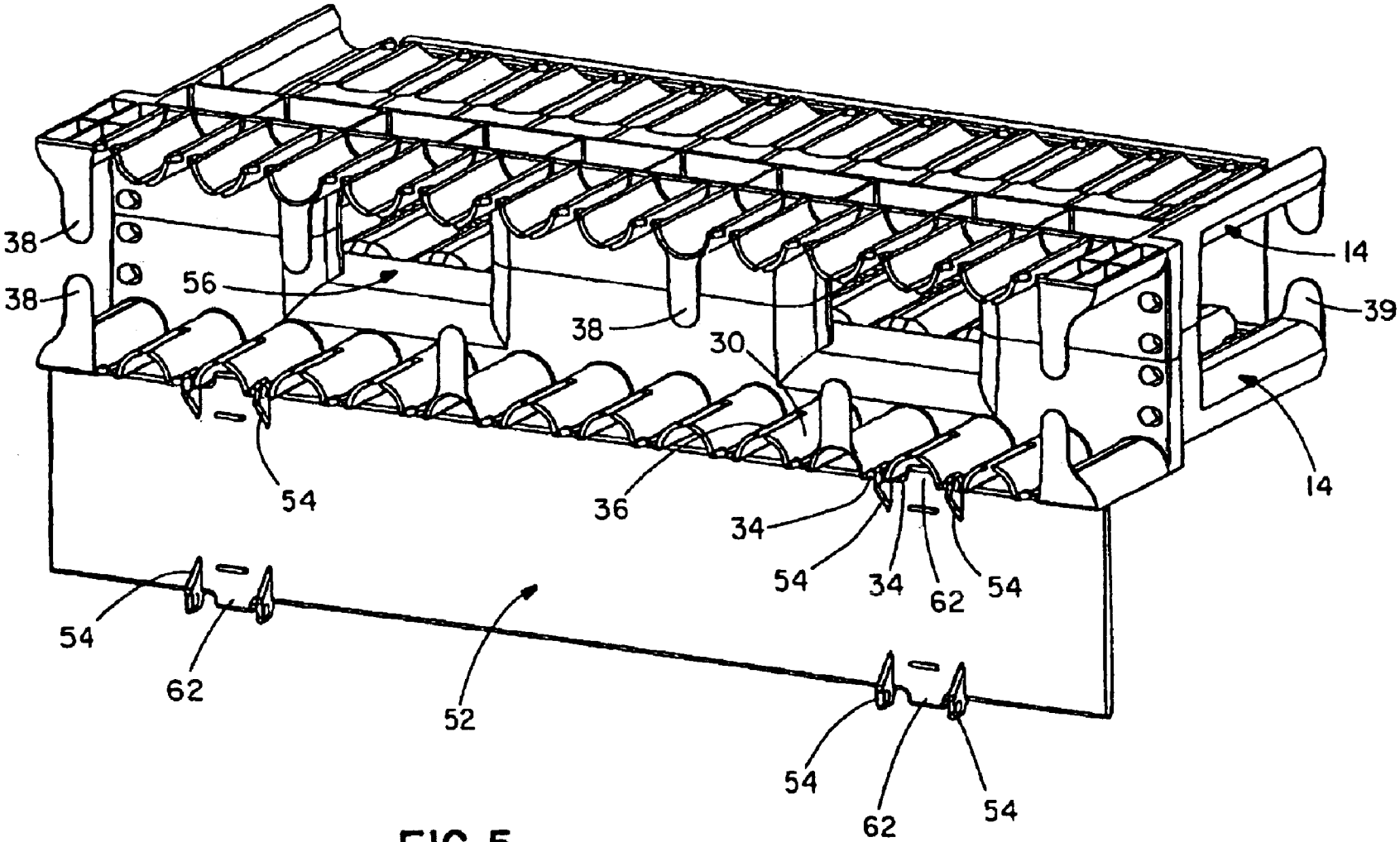
FIG. 5 is a top front perspective view of a cable manager of FIG. 1 with the cover in a bottom open position.

As best seen in FIGS. 3–5, the patching side of cable manager 10 includes a hingedly connected front cover 52, which can be rotated 180° up or down. That is, cover 52 can be opened from either side. Cover 52 may also be completely removable. Cover 52 is hingedly connected to cable manager 10 by a plurality of spaced apart pairs of hinge brackets 54 having apertures. The hinge brackets 54 are dimensioned so as to releasably engage with the tops of a pair of opposing ears 34 formed on adjacent patching fingers 30. A release tab 62 is formed in between hinge brackets 54 to allow for easier releasing of cover 52 by extending beyond the remaining periphery of cover 52.

Figure 9:
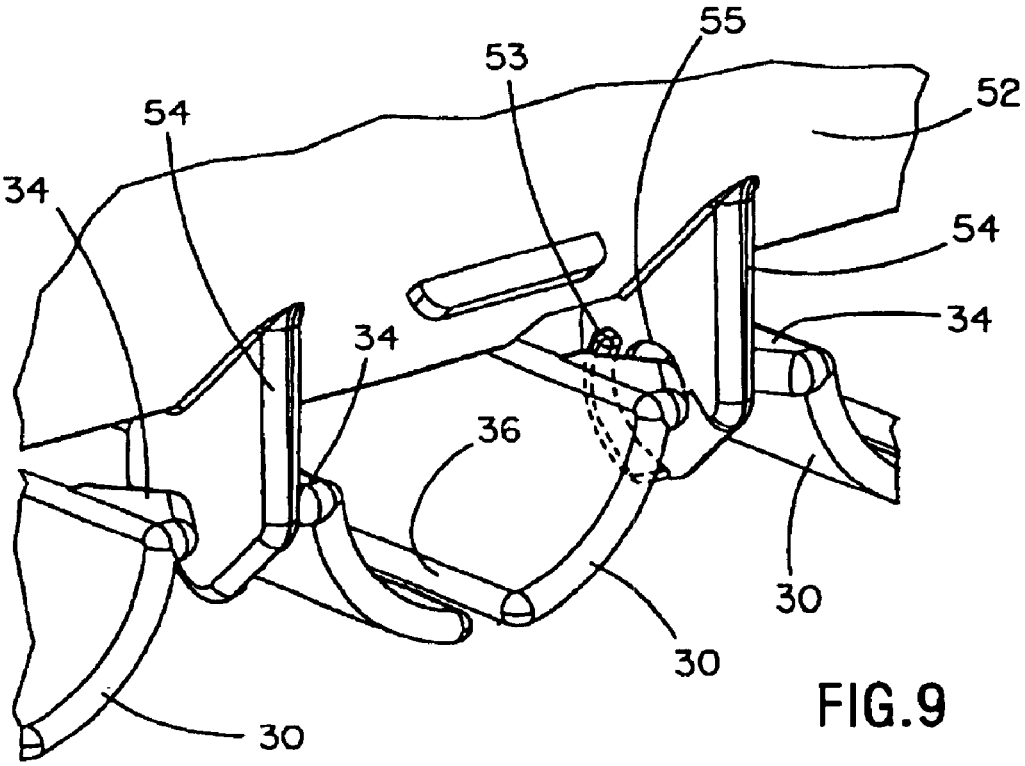
FIG. 9 is a partial perspective view of a hinged cover.
Figure 10:
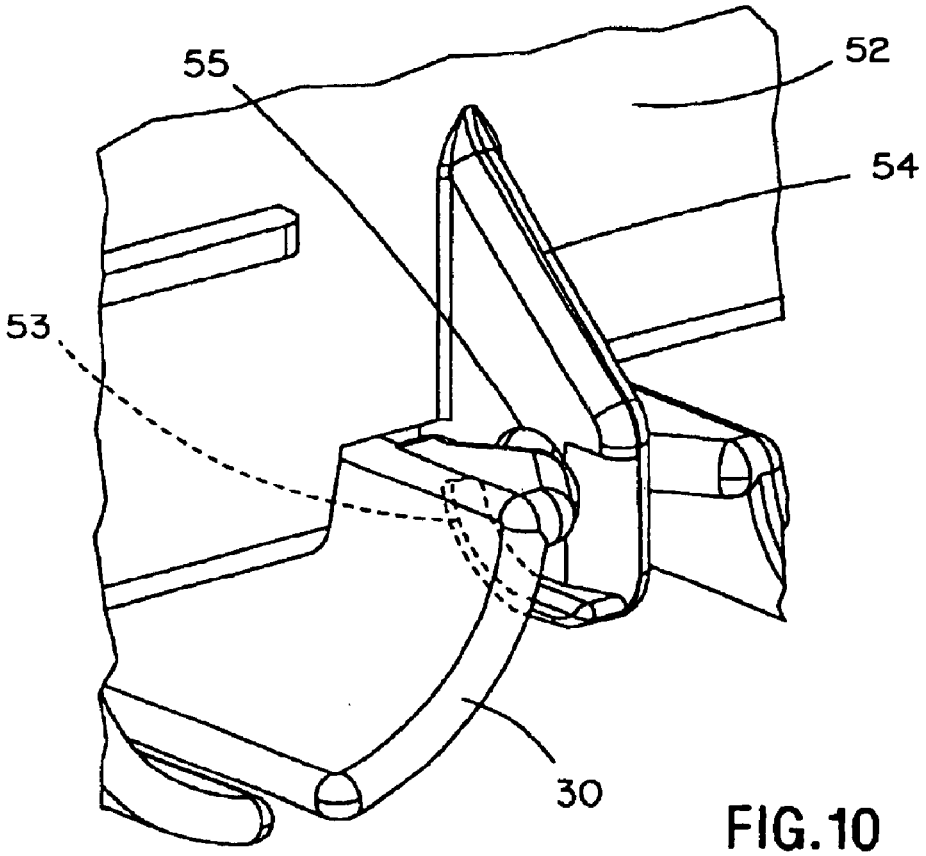
FIG. 10 is a partial view of the hinged cover of FIG. 9 in an open position.

A more detailed description of hinged cover 52 will be described with respect to FIGS. 9–10. Hinge brackets 54 include a semi-spherical aperture 55 that mates with a corresponding ear 34 to allow rotation thereabout and a locking tab 53 that engages with an edge of ear 34 to lock the cover in an open position when cover 52 is opened about 180°. Cover 52 can be closed by pulling forward on the cover to release locking tab 53 and allow rotation of cover 52 back to a closed position.

Figure 7:
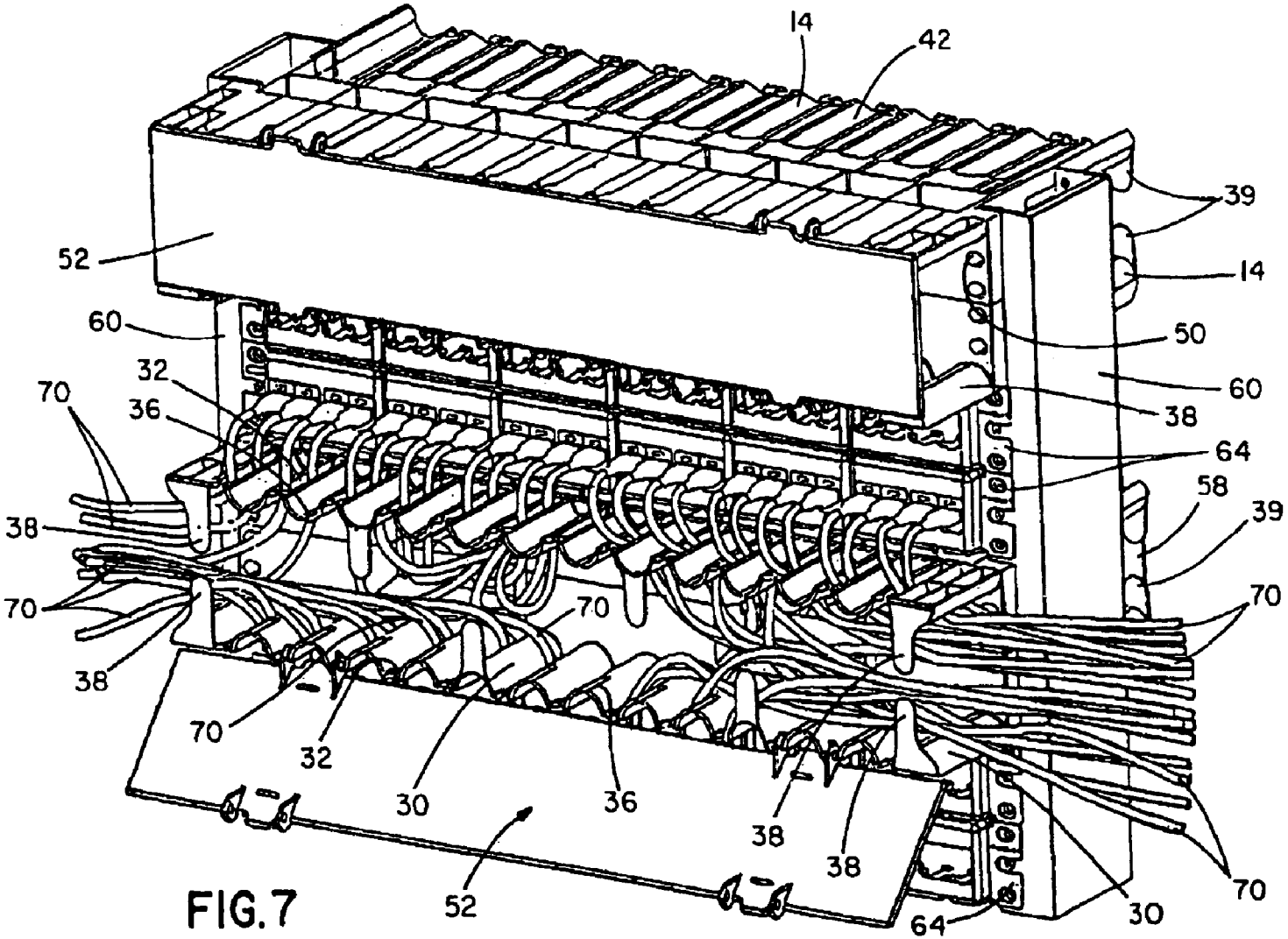
FIG. 7 is a top front perspective view of a network rack having a pair of the cable managers mounted on the rack.

FIG. 7 shows a pair of cable manager devices 10 mounted on a network rack having a pair of rack legs 60, adjacent to a plurality of patch panels 64. As shown, the cable managers 10 may be provided either above and/or below a patch panel 64. The lower cable manager device 10 is shown with the cover 52 rotated pen in the down position. As can be seen, cables 70, which terminate connectors connected to patch panels 64, are routed through the spaces 32 and around fingers 30 into the cable routing section whereby they exit at either end. With the inventive cable manager 10, good horizontal cable management can be achieved.

Figure 6:
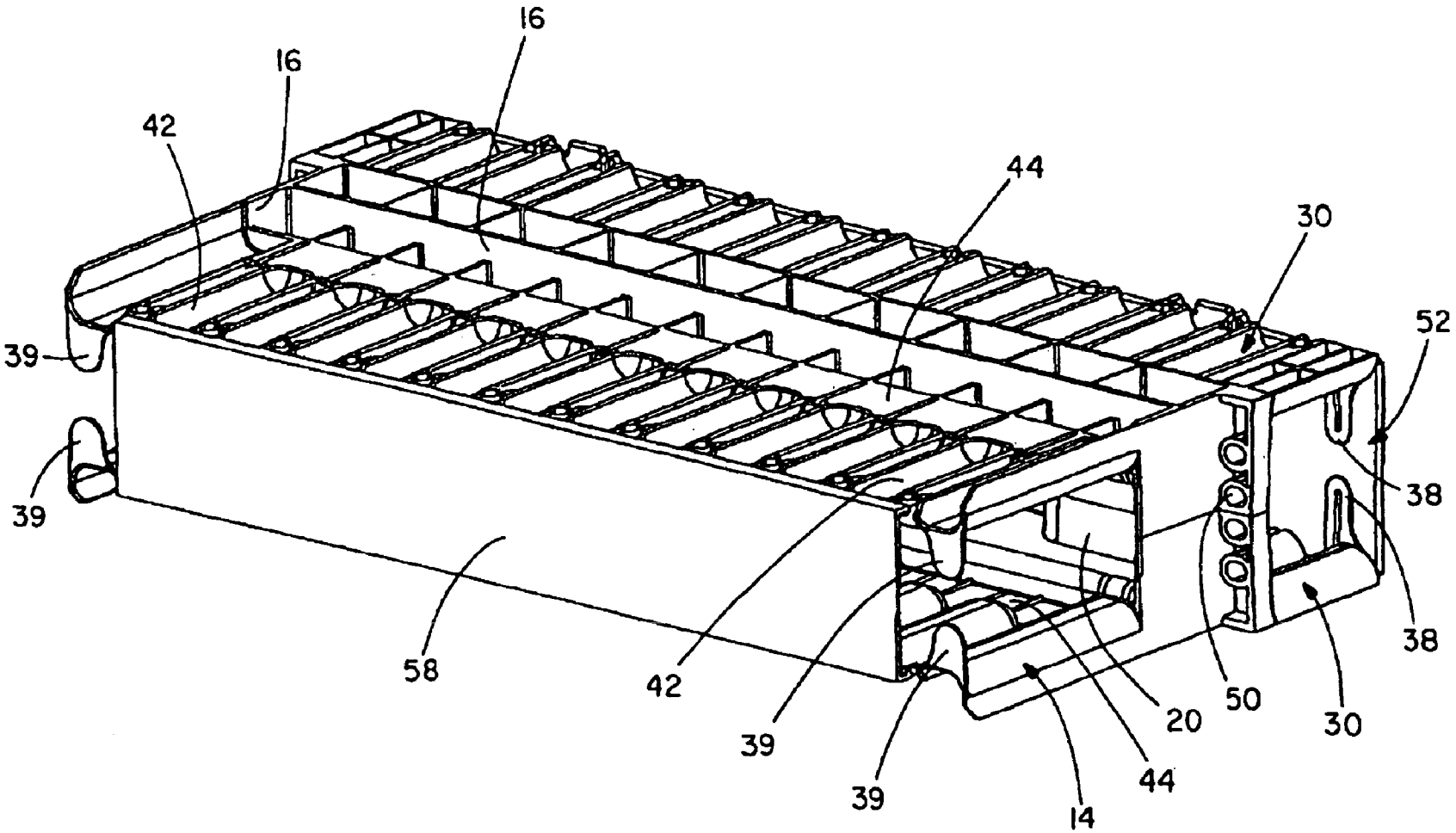
FIG. 6 is a top rear perspective view of the cable manager of FIG. 1, shown with closed covers.

The rear side of the cable manager (rear section 14) preferably forms the distribution side where cables from network equipment or a work station area can be terminated. As shown in FIGS. 2 and 6, distribution side fingers 40 are formed having arcuate portions 42 at least on a distal portion and a flat portion 44 at a proximal portion. As discussed above with reference to the front patching side, when the fingers are formed with an arcuate configuration, they are relatively stiff. On the distribution side, the installer often has need for greater access to the adjacent patch panels for their hands and other tools. Thus, by forming fingers 40 with the initial flat platform section 44, the fingers 40 can be made more flexible. The distal ends of fingers 40 on the distribution side include lips 48 for engagement with a duct cover 58. A suitable duct cover may snap fit on upstanding member 49 (see FIGS. 6 and 8). Alternatively, a hinged cove as used on the front section may be provided.

Figure 8:
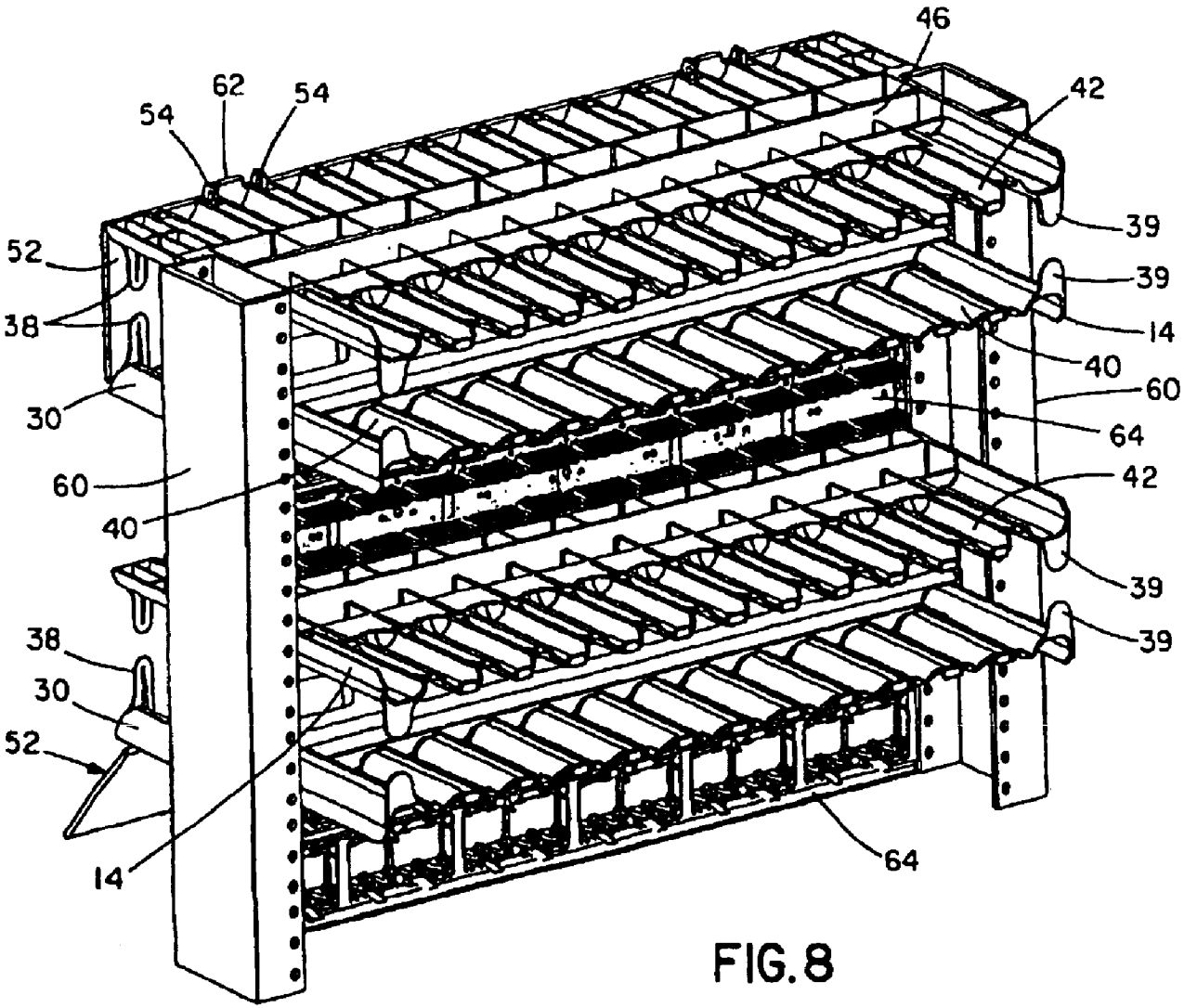
FIG. 8 is a top rear perspective view of a network rack having a pair of the cable managers mounted on the rack.

As shown in FIGS. 2 and 8, the distribution side also includes a stepped down portion 46 that provides additional room to accommodate a tool and/or a hand of an installer. That is, the base section 20 on the distribution side is narrower than the base section 18 on the patching side so that fingers 40 on the distribution side are spaced a little farther from the rear side of adjacent patch panels to provide additional clearance for the installer.

Selected fingers from both sets of fingers 30, 40 also include respective retaining flanges 38, 39 formed on the distal ends to help retain routed cables 70 when a cover is not present.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation.

What is claimed is:

[1. A cable manager mountable to a network rack, comprising:

a central section having a longitudinal width sized to fit within the network rack, a predetermined height, a front side, a rear side, and rack mounting holes provided on opposite longitudinal ends of the central section;

a front cable routing section extending from the front side of the central section, the front cable routing section including a first plurality of spaced fingers extending transversely from the front side of the central section;

a rear cable routing section extending from the rear side of the central section, the rear cable routing section including a second plurality of spaced fingers extending transversely from the rear side of the central section; and a hinged cover rotatably attachable to at least one of the first plurality of fingers and the second plurality of fingers.]

[2. The cable manager of claim 1, wherein the central section includes at least one passthrough opening that provides access between the front cable routing section and the rear cable routing section.]

[3. The cable manager of claim 2, wherein the at least one passthrough opening has curved sidewalls that provide bend radius control.]

[4. The cable manager of claim 1, wherein the first plurality of spaced fingers are formed with arcuate surfaces that provide bend radius control.]

5. [The cable manager of claim 4.] *A cable manager mountable to a network rack, comprising:*

*a central section having a longitudinal width sized to fit within the network rack, a predetermined height, a front side, a rear side, and rack mounting holes provided on opposite longitudinal ends of the central section;*

*a front cable routing section extending from the front side of the central section, the front cable routing section including a first plurality of spaced fingers extending transversely from the front side of the central section;*

*a rear cable routing section extending from the rear side of the central section, the rear cable routing section including a second plurality of spaced fingers extending transversely from the rear side of the central section; and*

*a hinged cover rotatably attachable to at least one of the first plurality of fingers and the second plurality of fingers,*

*wherein the first plurality of spaced fingers are formed with arcuate surfaces that provide bend radius control, and* wherein the distal end of the first plurality of spaced fingers include a slit medially disposed along the arcuate surface and extending toward a proximal end of the fingers.

[6. The cable manager of claim 4, wherein the distal end of the first plurality of spaced fingers include laterally extending ears.]

[7. The cable manager of claim 4, wherein the first plurality of spaced fingers are arranged in multiple spaced rows.]

[8. The cable manager of claim 7, wherein the hinged cover is attachable to at least one finger on at least two of the multiple spaced rows.]

[9. The cable manager of claim 8, wherein the cover includes hinge brackets.]

10. [The cable manager of claim 9.] *A cable manager mountable to a network rack, comprising:*

*a central section having a longitudinal width sized to fit within the network rack, a predetermined height, a front side, a rear side, and rack mounting holes provided on opposite longitudinal ends of the central section;*

*a front cable routing section extending from the front side of the central section, the front cable routing section including a first plurality of spaced fingers extending transversely from the front side of the central section;*

*a rear cable routing section extending from the rear side of the central section, the rear cable routing section including a second plurality of spaced fingers extending transversely from the rear side of the central section; and*

*a hinged cover rotatably attachable to at least one of the first plurality of fingers and the second plurality of fingers,*

*wherein the first plurality of spaced fingers are formed with arcuate surfaces that provide bend radius control,*

*wherein the first plurality of spaced fingers are arranged in multiple spaced rows,*

*wherein the hinged cover is attachable to at least one finger on at least two of the multiple spaced rows,*

*wherein the cover includes hinged brackets, and* wherein the distal end of the first plurality of spaced fingers include laterally extending ears and the hinge brackets are hingedly mounted between adjacent ones of the ears.

11. The cable manager of claim 10, wherein the cover further includes a locking tab lockable with one of the ears to lock the cover in an open position.

12. The cable manager of claim 10, wherein the cover includes a release tab.

13. The cable manager of claim 10, wherein the cover is hingedly openable in two opposite directions.

[14. The cable manager of claim 1, wherein the second plurality of spaced fingers are arranged in two spaced rows.]

[15. The cable manager of claim 14, wherein the rear side of the central section includes a step down portion such that the two spaced rows have a height that is less than the predetermined height of the central section.]

[16. The cable manager of claim 14, further comprising a second cover attachable to the second plurality of spaced fingers.]

[17. A network rack, comprising:

a rack frame having mounting legs;

at least one patch panel mounted to the mounting legs of the rack frame; and a cable manager mounted to the mounting legs to be adjacent the at least one patch panel, the cable manager comprising:

a central section having a longitudinal width sized to fit within the rack frame, a front side, a rear side, and rack mounting holes provided on opposite longitudinal ends of the central section;

a front cable routing section extending from the front side of the central section, the front cable routing section including a first plurality of spaced fingers extending transversely from the front side of the central section and retaining flanges extending from distal ends of multiple ones of the first plurality of spaced fingers;

a rear cable routing section extending from the rear side of the central section, the rear cable routing section including a second plurality of spaced fingers extending transversely from the rear side of the central section and retaining flanges extending from distal ends of multiple ones of the second plurality of spaced fingers; and a hinged cover rotatably attachable to at least one of the first plurality of fingers and the second plurality of fingers.]

[18. The network rack of claim 17, wherein the at least one patch panel has a patching side and a distribution side, the front cable routing section is provided on the patching side and the rear cable routing section is provided on the distribution side.]

[19. The network rack of claim 18, wherein the rear side of the central section includes a step down portion such that the two spaced rows have a height that is less than the predetermined height of the central section.]

[20. The network rack of claim 17, wherein the first plurality of fingers have an arcuate surface that provides bend radius control.]

[21. The network rack of claim 17, wherein the central section includes at least one passthrough opening that provides access between the front cable routing section and the rear cable routing section.]

22. A cable manager mountable to a network rack, comprising:

a central section having a longitudinal width sized to fit within the network rack, a predefined height, a front side, a rear side, and rack mounting holes provided on opposite longitudinal ends of the central section; and a front cable routing section extending from the front side of the central section, the front cable routing section including a plurality of spaced fingers extending transversely from the front side of the central section, wherein each of the plurality of spaced fingers has an arcuate surface that provides bend radius control to cables routed thereover, and a slit is medially disposed along the arcuate surface and extends from a distal end of the finger towards a proximal end of the finger, wherein at least one ear laterally extends from near the distal end into a receiving space between adjacent fingers, the at least one ear assisting in insertion and removal of cables in the receiving space.

23. A cable manager mountable to a network rack, comprising:

a central section having a longitudinal width sized to fit within the network rack, a predefined height, a front side, a rear side, and rack mounting holes provided on opposite longitudinal ends of the central section;

a front cable routing section extending from the front side of the central section, the front cable routing section including a plurality of spaced fingers extending transversely from the front side of the central section, wherein each of the plurality of spaced fingers has an arcuate surface that provides bend radius control to cables routed thereover, and a slit is medially disposed along the arcuate surface and extends from a distal end of the finger towards a proximal end of the finger, wherein the plurality of spaced fingers are arranged in multiple spaced rows; and a front cover attachable to at least one finger on at least two of the multiple spaced rows.

24. The cable manager of claim 23, wherein at least one ear laterally extends from near the distal end into a receiving space between adjacent fingers and the front cover is a hinged cover that includes hinge brackets hingedly mounted between adjacent ones of the ears that allow positioning of the hinged cover between open and closed positions.

25. The cable manager of claim 24, wherein the hinged cover further comprises a locking tab lockable with one of the ears to lock the hinged cover in the open position.

26. The cable manager of claim 23, wherein the front cover includes a release tab.

27. A cable manager mountable to a network rack, comprising:

a central section having a longitudinal width sized to fit within the network rack, a predefined height, a front side, a rear side, and rack mounting holes provided on opposite longitudinal ends of the central section;

a front cable routing section extending from the front side of the central section, the front cable routing section including a plurality of spaced fingers extending transversely from the front side of the central section, wherein each of the plurality of spaced fingers has an arcuate surface that provides bend radius control to cables routed thereover, and a slit is medially disposed along the arcuate surface and extends from a distal end of the finger towards a proximal end of the finger;

a rear cable routing section extending from the rear side of the central section, the rear cable routing section including a second plurality of spaced fingers extending transversely from the rear side of the central section, wherein the second plurality of spaced fingers are arranged in two spaced rows; and a rear cover attachable to at least one finger on each of the two spaced rows of the second plurality of spaced fingers.

28. A network rack, comprising:

a rack frame having mounting legs;

at least one patch panel mounted to the mounting legs of the rack frame; and a cable manager mounted to the mounting legs and being adjacent the at least one patch panel, the cable manager comprising:

a central section having a longitudinal width sized to fit within the network rack, a front side, a rear side, and rack mounting holes provided on opposite longitudinal ends of the central section; and a front cable routing section extending from the front side of the central section, the front cable routing section including a plurality of spaced fingers extending transversely from the front side of the central section, wherein the plurality of spaced fingers are provided in two spaced rows and a cover is hingedly attachable to at least one finger in each of the two spaced rows, wherein each of the plurality of spaced fingers has an arcuate surface that provides bend radius control, and a slit is medially disposed along the arcuate surface and extends from a distal end of the finger towards a proximal end of the finger.

[29. A cable manager mountable to a network rack, comprising:

a central section having a longitudinal width sized to fit within the network rack, a predefined height, a front side, a rear side, and rack mounting holes provided on opposite longitudinal ends of the central section;

a front cable routing section extending from the [first] *front* side of the central section, the front cable routing section including a plurality of spaced fingers extending transversely from the front side of the central section, wherein the central section includes at least one passthrough opening that provides access to the front cable routing section; and a hinged cover rotatably attachable to the plurality of fingers.]

[30. The cable manager of claim 29, wherein the plurality of spaced fingers are arranged in multiple spaced rows.]

[31. The cable manager of claim 30 wherein the hinged cover is attachable to at least one finger on at least two of the multiple spaced rows.]

[32. The cable manager of claim 31, wherein the cover is hingeably openable in two opposite directions.]

[33. The cable manager of claim 29, further comprising retaining flanges extending from distal ends of multiple ones of the plurality of spaced fingers.]

* * * * *